(12) United States Patent
Hoover

(10) Patent No.: US 9,968,822 B2
(45) Date of Patent: May 15, 2018

(54) RUSH SIMULATING ROWING DEVICE

(71) Applicant: Kari A Hoover, Chicago, IL (US)

(72) Inventor: Kari A Hoover, Chicago, IL (US)

( * ) Notice: Subject to any disclaimer, the term of this patent is extended or adjusted under 35 U.S.C. 154(b) by 232 days.

(21) Appl. No.: 15/160,194

(22) Filed: May 20, 2016

(65) Prior Publication Data

US 2016/0271441 A1    Sep. 22, 2016

Related U.S. Application Data

(60) Provisional application No. 62/204,045, filed on Aug. 12, 2015.

(51) Int. Cl.
| | | |
|---|---|---|
| *A63B 24/00* | (2006.01) | |
| *A63B 22/00* | (2006.01) | |
| *G09B 19/00* | (2006.01) | |
| *A63B 69/06* | (2006.01) | |
| *A63B 21/005* | (2006.01) | |
| *A63B 21/008* | (2006.01) | |
| *A63B 21/22* | (2006.01) | |

(52) U.S. Cl.
CPC ...... *A63B 22/0076* (2013.01); *A63B 22/0087* (2013.01); *A63B 69/06* (2013.01); *G09B 19/0038* (2013.01); *A63B 21/0058* (2013.01); *A63B 21/0083* (2013.01); *A63B 21/225* (2013.01); *A63B 24/0087* (2013.01); *A63B 2022/0079* (2013.01); *A63B 2069/062* (2013.01); *A63B 2220/801* (2013.01)

(58) Field of Classification Search
CPC . A63B 22/0076; A63B 22/087; A63B 22/089; A63B 2022/079
See application file for complete search history.

(56) References Cited

U.S. PATENT DOCUMENTS

| | | | | |
|---|---|---|---|---|
| 4,984,986 | A * | 1/1991 | Vohnout ................. | A63B 24/00 434/247 |
| 7,833,136 | B2 * | 11/2010 | Bell ..................... | A63B 21/154 482/138 |
| 7,946,964 | B2 * | 5/2011 | Gothro .................. | A63B 22/16 434/60 |
| 8,109,859 | B2 * | 2/2012 | Medina .............. | A63B 22/0076 482/148 |
| 8,622,876 | B2 * | 1/2014 | Kelliher ............... | A63B 21/154 482/51 |
| 9,486,666 | B2 * | 11/2016 | Singh ................. | A63B 22/0076 |
| 9,770,622 | B2 * | 9/2017 | Campanaro ........ | A63B 22/0087 |
| 2005/0085348 | A1 * | 4/2005 | Kiefer ................ | A63B 22/0076 482/72 |
| 2008/0261782 | A1 * | 10/2008 | Campbell .......... | A63B 22/0076 482/72 |

(Continued)

*Primary Examiner* — Joshua T Kennedy

(57) ABSTRACT

A rowing device having a seat and track arrangement, a handle, and a resistance mechanism, with the seat track being disposed on a carriage. The carriage itself is movable relative to a base of the device and is drivable in a posterior and anterior direction. The device includes a controller operatively connected to a drive mechanism and to a seat position sensor. As the rower exercises, the controller sometimes generates an instruction to move the carriage in an anterior direction when the seat is at or near its posterior extreme position, to thereby simulate a "rush" circumstance as may be encountered on a crewed shell.

4 Claims, 4 Drawing Sheets

(56) References Cited

U.S. PATENT DOCUMENTS

| | | | |
|---|---|---|---|
| 2011/0028278 A1* | 2/2011 | Roach | A63B 22/0076 |
| | | | 482/72 |
| 2012/0225753 A1* | 9/2012 | Lim | H04B 7/024 |
| | | | 482/4 |
| 2013/0130206 A1* | 5/2013 | Smith | A63B 24/0006 |
| | | | 434/29 |
| 2018/0056133 A1* | 3/2018 | Lagree | A63B 24/0075 |

* cited by examiner

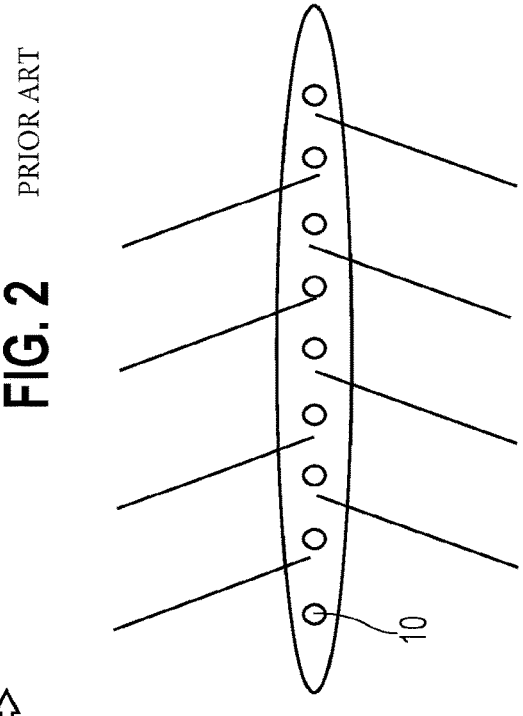
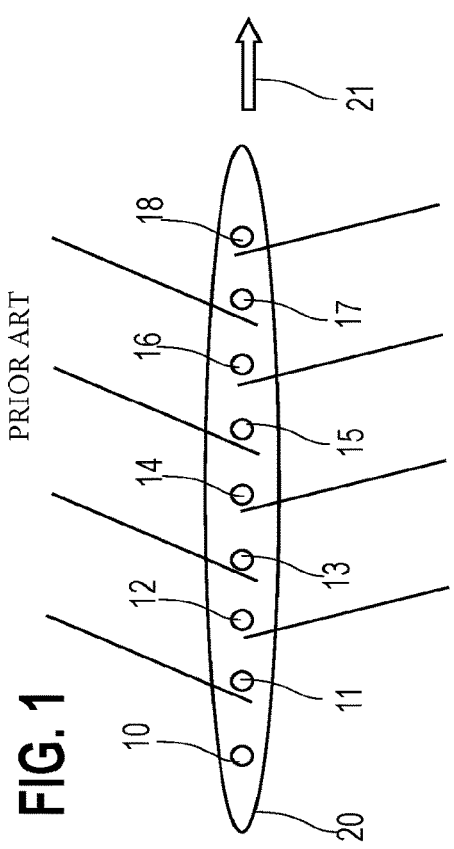
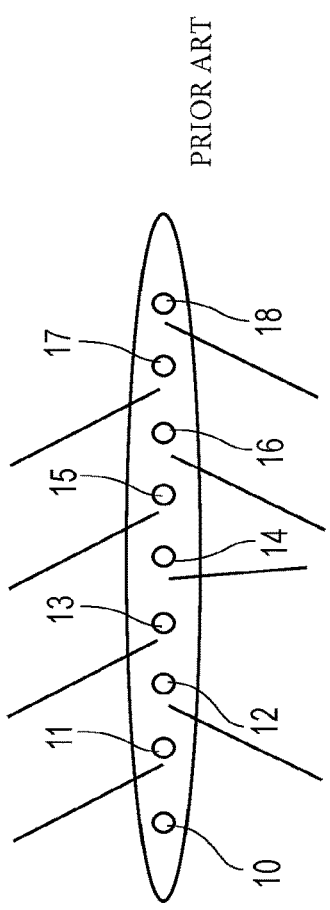

RUSH SIMULATING ROWING DEVICE

FIELD

The disclosure is in the field of exercise and athletic training equipment.

BACKGROUND

The sport of rowing is increasingly popular. In this port, a rowing crew propels a rowing shell through the water and races against a competing team or in a timed trial. Single-crewed shells are sometimes raced, but more commonly a racing shell is crewed by multiple rowers, sometimes with a coxswain. In such cases, an important aspect of the sport is for the rowers to synchronize their rowing strokes to the extent possible. Crew teams practice rowing on indoor rower devices, known colloquially as "ergometers" or "ergs."

The ideal crew stroke consists of four phases, the catch, the drive, the extract, and the recovery, with the ratio of drive to recovery time being 1:2 (drive:recovery). Conventionally, the stern-most rower, known as the "stroke" rower, sets the pace for the successive rowers, assisted by commands from the coxswain. All of the rowers are seated on seats that slide on a short track and that move relative to the hull of the shell. During the drive phase of the stroke, the seats move relatively forward (i.e., towards the bow of the boat), while during the recovery phase of the stroke, the seats move relatively sternwards. In some cases, a forward rower will "rush" the stroke and reduce the recovery time relative to the drive time, in a manner out of synchronization with the stroke rower. When this happens, the seats of rowers to the stern, particularly the stroke rower, will be urged forward as the rower is sliding the seat sternward, thereby requiring an adjustment to those rower's strokes.

SUMMARY

It is desired to provide a device to simulate a "rush" stroke by forward rowers to allow rowers, particularly stroke rowers, to train for this circumstance. For this purpose, a rowing device having a seat and track arrangement, a handle, and a resistance mechanism is provided, with the seat track being disposed on a carriage. The carriage itself is movable relative to a base of the device and is drivable in a posterior and anterior direction. The device includes a controller operatively connected to a drive mechanism and optionally to a seat position sensor. As the rower exercises, the controller sometimes generates an instruction to move the carriage in an anterior direction to thereby simulate a "rush" circumstance as may be encountered on a crewed shell. The controller subsequently directs the carriage to recover to a posterior position to thereby reset the carriage for a subsequent rush simulation. The motion of the carriage in the anterior direction during the rush simulation is generally more rapid than the motion posterior direction during recovery. The controller is a programmed logic device that may be set to simulate a rush periodically or at apparently random times, and preferably is coupled to a user interface that allows the user to vary the frequency of rush simulations.

DESCRIPTION OF THE FIGURES

FIG. 1 is a schematic representation of a rowing shell at the start of the drive phase, with the rowers in synchronization.

FIG. 2 is a schematic representation of a rowing shell at the start of the recovery phase, with the rowers in synchronization.

FIG. 3 is a schematic representation of a rowing shell during the recovery phase where a rower has rushed the recovery.

FIGS. 4-6 are schematic representations and the configuration and arrangement of the components may be conventional or otherwise as may be deemed suitable to those skilled in the art.

DETAILED DESCRIPTION

Figure 4:
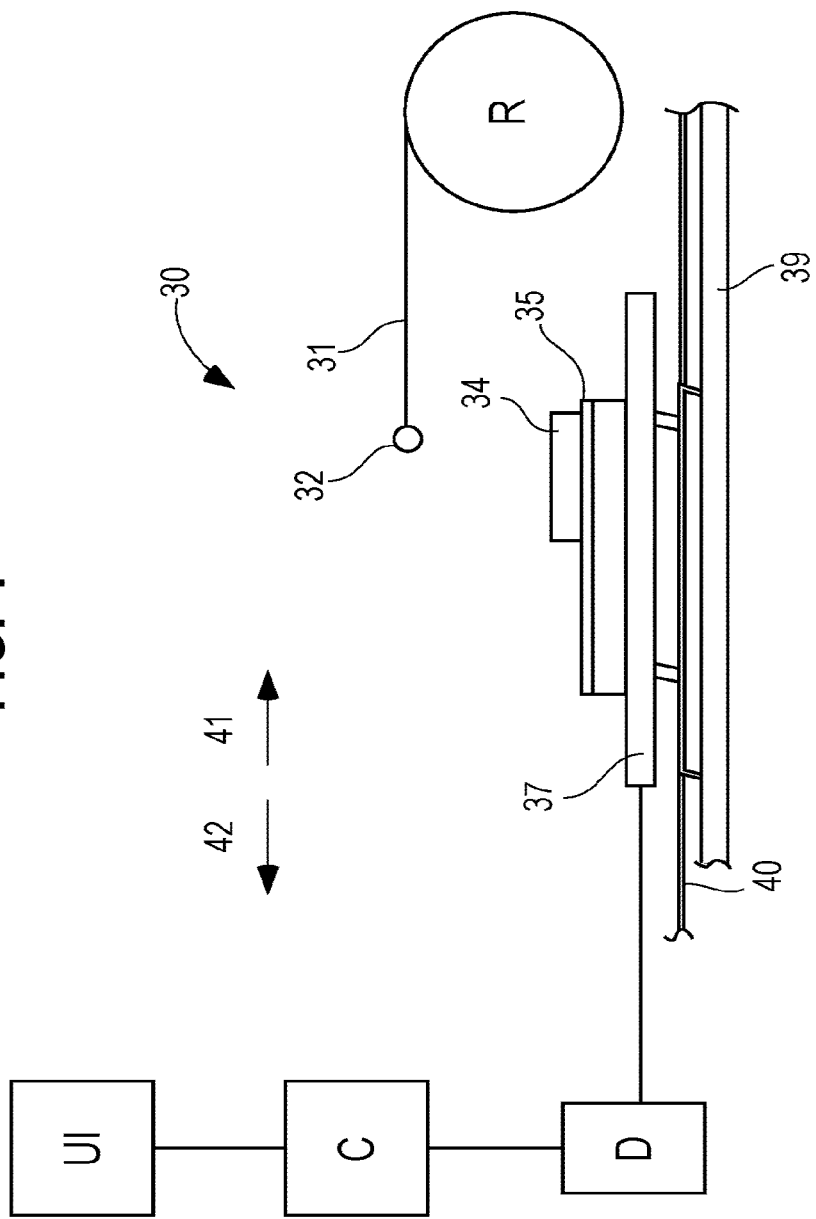
FIG. 4 is a schematic representation of a rowing device, illustrating the handle and seat at the start of the drive phase.

As seen in FIGS. 1 and 2, with regard to coxswain 10, stroke rower 11, and rowers 12-18, in the ideal rowing pattern all of the rowers are synchronized, such that the oar angle of the port rowers 11, 13, 17, and 15 relative to the hull 20 is roughly supplementary to the oar angle of the starboard rowers 12, 14, 16, 18 as the shell travels in the direction of arrow 21. When the crew includes a coxswain, he or she faces the bow of the boat and steers the shell; the remaining crew members face the stern of the shell. At the start of the recovery phase, the seats of the rowers should be disposed forward on the seat track (i.e., towards the bow of the boat). When rower 14 has rushed the stroke, as seen in FIG. 3, the seat of the stroke rower 11 will be urged forward as the rower is attempting to recover and move the seat rearward.

Figure 5:
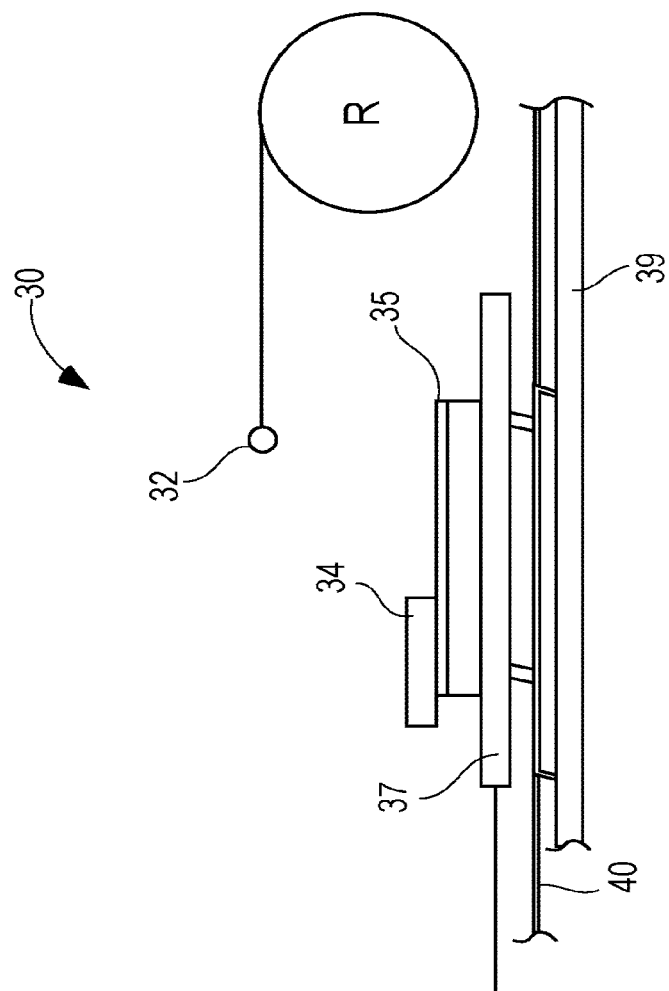
FIG. 5 is a schematic representation of the rowing device shown in FIG. 4, illustrating the handle and seat at the conclusion of the drive phase.
Figure 6:
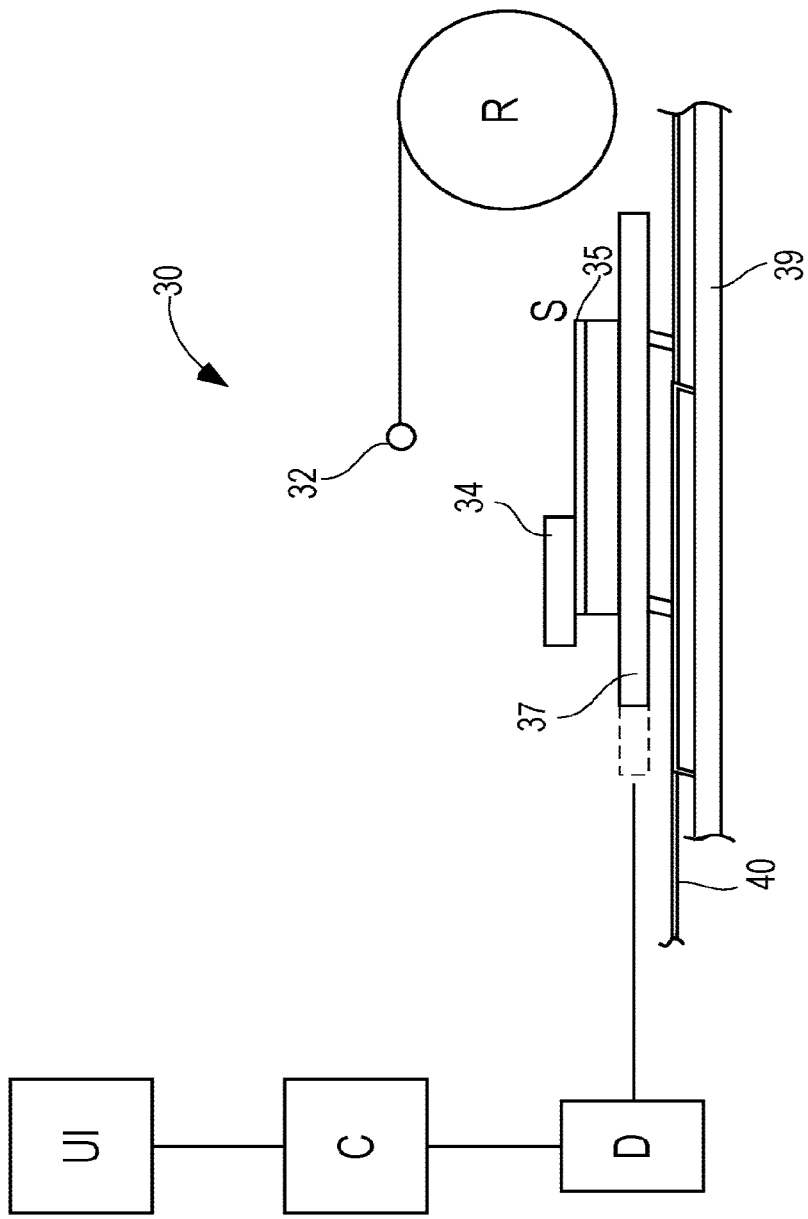
FIG. 6 is a schematic representation of the rowing device shown in FIG. 4, illustrating the position of the carriage and seat during a rush simulation.

To simulate this, the rowing device 30 shown in FIGS. 4-6 includes a source of resistance R (such as a flywheel or other conventional resistance source) coupled by a cable 31 to a handle 32. The user is seated on a seat 34 which slides on a track 35 between a fully anterior position, as shown in FIG. 4, and a fully posterior position, as shown in FIG. 5, the anterior and posterior positions being defined relative to the direction a user normally would face and being shown by arrows 41, 42 respectively in FIG. 4. By pulling on the handle, the rowing stroke is simulated, and in this regard the device may be conventional. In practice the device may include other conventional rowing device components.

The seat track 35 is disposed on a carriage 37 which is itself moveable relative to a base 39 of the device. Preferably the carriage slides on its own track 40. The carriage is movable via a drive mechanism D, which can be any suitable mechanism such as a motor or hydraulic piston. The drive is operatively coupled to a controller C, which can be any suitable logic device, such as an EEPROM with associated suitable programming. The controller is operatively coupled to a user interface UI, which may be, for instance, a touch screen device allowing user display and input. In practice, the controller may be a common controller used for other monitoring and control of the device, e.g., for timing purposes, and the user interface may display timing and other data associated with the user's exercise routine.

The rower may row in a conventional manner and if desired the controller may be programmed to permit same with no rush simulation. When desired, the controller may be programmed to urge the carriage to the anterior direction, as seen in FIG. 6, to simulate a rush circumstance. The controller should be programmed to cause a recovery from the simulation by moving the carriage in the posterior direction. The velocity of the carriage in said anterior direction in a rush circumstance should be relatively greater than the velocity of said carriage in said posterior direction for recovery, such that the simulated rush is experienced as somewhat abrupt while the recovery is noticed only minimally.

Preferably, the device is equipped with a seat position sensor S (shown only in FIG. 6) that also is operatively coupled to the controller. The controller may be programmed to cause a rush simulation when seat position sensor signals that the seat is near the end of a drive phase or near the beginning of a recovery phase, i.e., closer to the fully posterior position. While it is envisioned that a rush could be programmed for every stroke, the controller preferably causes a rush simulation only on an occasional basis, i.e., not on every stroke. The basis may be a time periodic basis, i.e., a rush is simulated with a preselected or user-selected time frequency. The basis alternatively may be a stroke periodic basis, i.e., a rush is simulated with a preselected or user-selected stroke frequency. Still alternatively, the basis may be an apparently random basis, whereby a rush is simulated on a random or pseudorandom number of strokes. Preferably, via the user interface, the user may select which of these bases apply, as well as modify the frequency or general frequency of the rush simulation condition.

The carriage track may be enclosed in a fairing or housing (not shown) for safety reasons. Generally, the components of the device otherwise may be conventional.

It is therefore seen that a rowing device that simulates a rush condition may be provided in accordance with the above.

Uses of singular terms such as "a," "an," are intended to cover both the singular and the plural, unless otherwise indicated herein or clearly contradicted by context. The terms "comprising," "having," "including," and "containing" are to be construed as open-ended terms. Any description of certain embodiments as "preferred" embodiments, and other recitation of embodiments, features, or ranges as being preferred, or suggestion that such are preferred, is not deemed to be limiting. The invention is deemed to encompass embodiments that are presently deemed to be less preferred and that may be described herein as such. All methods described herein can be performed in any suitable order unless otherwise indicated herein or otherwise clearly contradicted by context. The use of any and all examples, or exemplary language (e.g., "such as") provided herein, is intended to illuminate the invention and does not pose a limitation on the scope of the invention. Any statement herein as to the nature or benefits of the invention or of the preferred embodiments is not intended to be limiting. This invention includes all modifications and equivalents of the subject matter recited herein as permitted by applicable law. Moreover, any combination of the above-described elements in all possible variations thereof is encompassed by the invention unless otherwise indicated herein or otherwise clearly contradicted by context. The description herein of any reference or patent, even if identified as "prior," is not intended to constitute a concession that such reference or patent is available as prior art against the present invention. No unclaimed language should be deemed to limit the invention in scope. Any statements or suggestions herein that certain features constitute a component of the claimed invention are not intended to be limiting unless reflected in the appended claims. Neither the marking of the patent number on any product nor the identification of the patent number in connection with any service should be deemed a representation that all embodiments described herein are incorporated into such product or service.

What is claimed is:

1. A rowing device comprising a user seat, a track, a handle, and a resistance generator, said seat sliding on said track between an extreme posterior position and an extreme anterior position, said handle cooperating with said resistance generator to generate resistance as the handle is pulled in a posterior direction, said track being mounted on a carriage, said carriage being disposed on a base and being drivable by a drive mechanism in an anterior direction and a posterior direction relative to said base, the device including a controller operatively coupled to said drive mechanism for causing said carriage to move in an anterior direction to simulate a rush circumstance and to recover in a posterior direction, the velocity of said carriage in said anterior direction in a rush circumstance being relatively greater than the velocity of said carriage in said posterior direction for recovery.

2. The rowing device of claim 1, the seat having a seat position sensor operatively coupled to said controller, the controller simulating a rush circumstance when the seat position sensor signals that the seat is near the end of a drive phase or near the beginning of a recovery phase.

3. The rowing device of claim 1, the controller causing a rush simulation on an occasional basis selected from among (1) a time periodic basis; (2) a stroke periodic basis; and (3) an apparently random basis.

4. The rowing device of claim 3, the controller being coupled to a user interface that permits the user to adjust the basis of the rush simulation.

* * * * *